July 21, 1964
R. M. SHIRK
3,141,843
FINES REMOVAL FROM SOLIDS CIRCULATING SYSTEM
Filed May 23, 1961
2 Sheets-Sheet 1
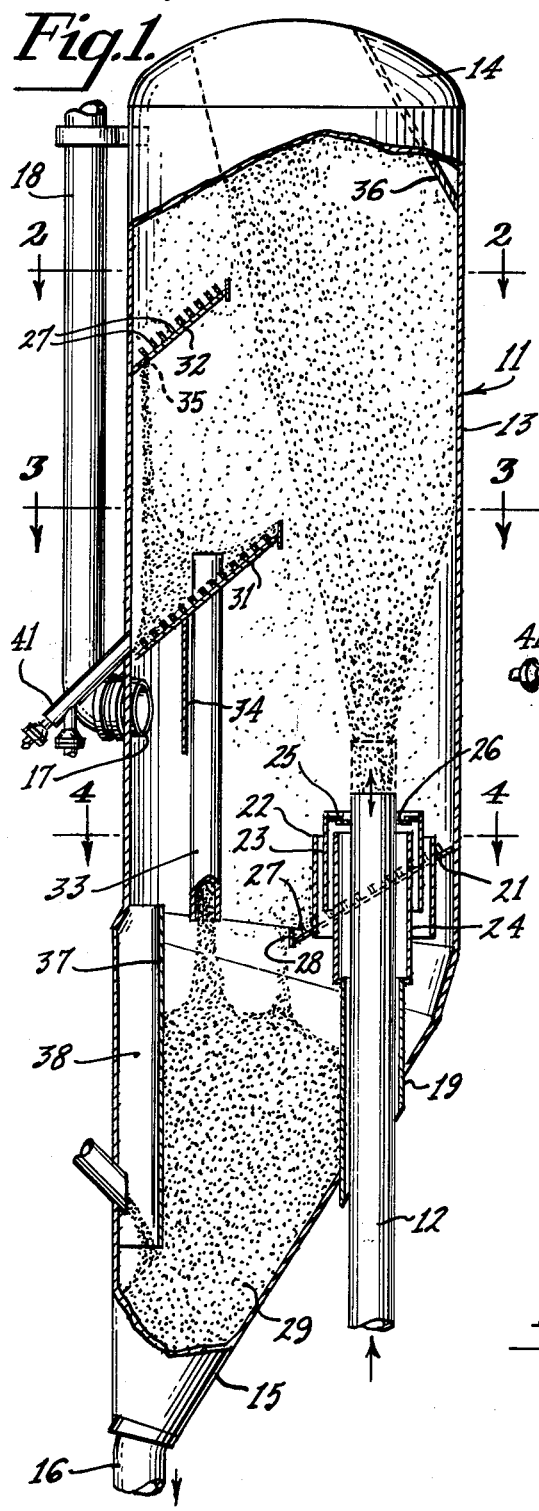
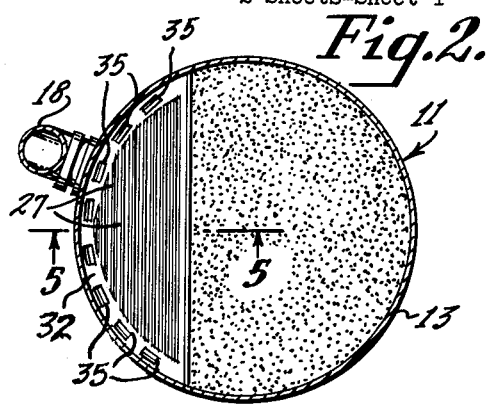
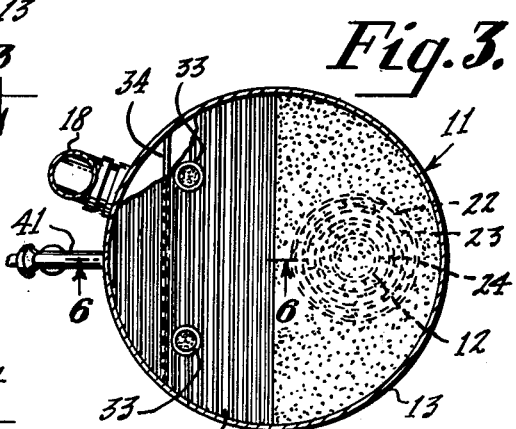
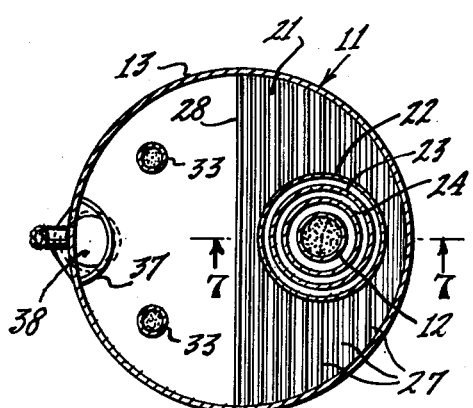
INVENTOR.
Robert M. Shirk
BY
William Klabunde
ATTORNEY.

July 21, 1964 R. M. SHIRK 3,141,843
FINES REMOVAL FROM SOLIDS CIRCULATING SYSTEM
Filed May 23, 1961 2 Sheets-Sheet 2
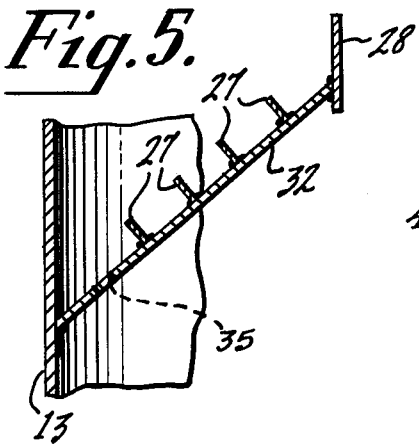
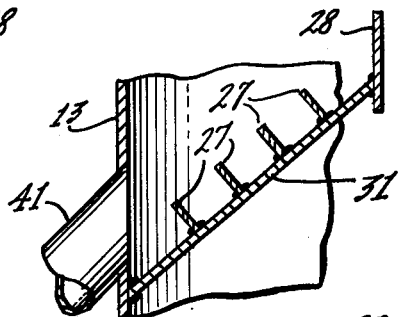
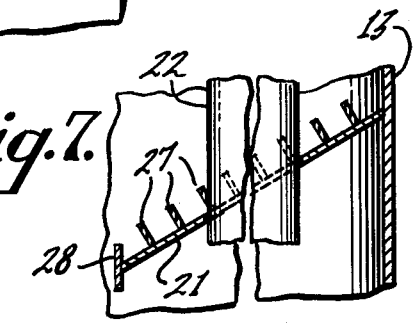
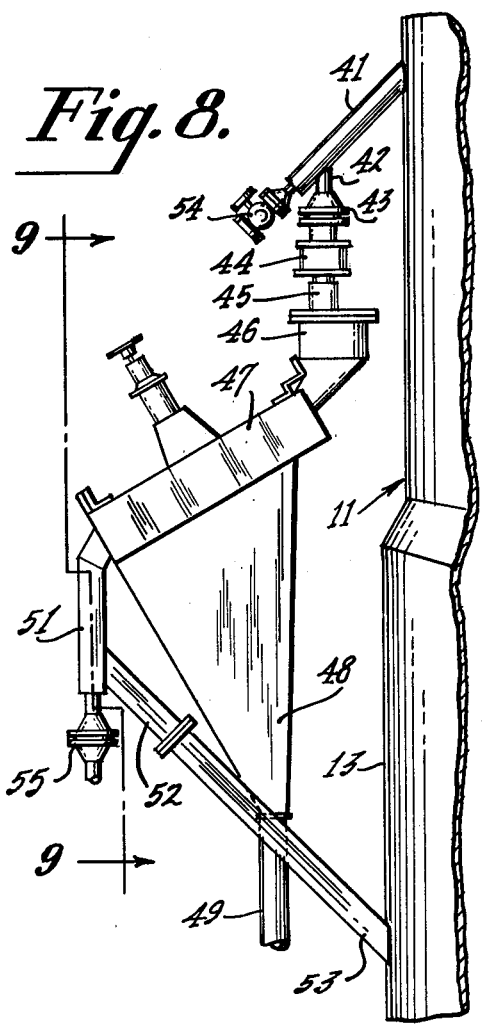
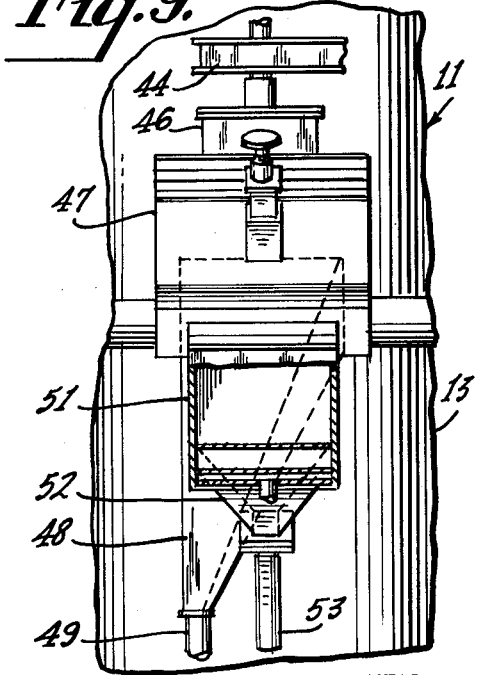
INVENTOR.
Robert M. Shirk.
BY
William Klabunde
ATTORNEY.

United States Patent Office

3,141,843
Patented July 21, 1964

3,141,843
FINES REMOVAL FROM SOLIDS CIRCULATING
SYSTEM
Robert M. Shirk, Wilmington, Del., assignor to Air Products and Chemicals, Inc., a corporation of Delaware
Filed May 23, 1961, Ser. No. 112,105
6 Claims. (Cl. 209—37)

This invention relates, in general, to systems for carrying out chemical conversions involving the continuous circulation of granular contact material, such as catalyst in the form of pellets or beads, within a closed path including a plurality of treating zones wherein chemical reactants in gaseous state, such as vaporized hydrocarbons, are contacted with gravitating granular material in the form of a compact moving mass or bed to effect the desired conversions.

More specifically, the invention is directed to those systems wherein the continuous circulation of the granular contact material is effected by gravitational fall or flow thereof through one or more confined downflow paths and subsequent pneumatic elevation thereof through one or more upright confined lift paths. The invention is particularly concerned with apparatus for disengaging the granular contact material from the lift gas at the top of the pneumatic lift and of removing undesirable small attrited particles of granular material, or fines, from the circulating body of granular contact material.

The flow problems arising from the gradual accumulation of any substantial quantity of fines in the circulatory system are well recognized in the processing arts and it has long been a practice to either periodically or as a continuous operation remove the fines from the system. To this end it has been a common practice to withdraw a portion of the circulating body of granular material and to subject such portion to elutriation by causing the same to descend countercurrently within a rising stream of gaseous material, the selected velocity of the rising gaseous stream being such as to entrain all unwanted small particles up to a predetermined size, while permitting the larger-size particles, of a size suitable for recirculation, to fall to the bottom of the elutriator and flow back into the circulatory system at some selected location for re-entry.

The stream of solids to be elutriated generally comprises freshly regenerated solids withdrawn at a location near the top of the circulatory system, particularly from the pneumatic lift disengager, so that the retained larger-size particles may be passed back into the system at any desired lower level along the downflow path. In some cases, ellutriated reusable solids have been passed directly to the compact moving beds of solids maintained in one of the process vessels. A serious disadvantage of such method is that the freshly regenerated solids are unlike the solids forming the bed, particularly with respect to coke and hydrocarbon contamination, temperature, particle size range, etc., and, when introduced into the reactor or kiln they tend to establish a vertical core of dissimilar solids throughout the system within which the gas composition and the reactions, if any, are unlike those in the remaining regions of the zone. In the kiln, for example, this could result in a concentration of oxygen-rich gas at the top of the coke burning zone which, when commingled the combustible materials would promote afterburning in the outlet ducts.

In other cases, the re-usable solids have been passed from the elutriator to the pneumatic lift engager. This method necessitates re-elevation of the returned portion of solids through the regular lift system, or auxiliary lifting, in either case adding to the blower requirements.

More suitably, the solids withdrawn from the disengager are immediately freed of fines and returned to the surge supply maintained either in the bottom of the disengager vessel or in a separate surge vessel or surge chamber associated with a process vessel below the disengager. A typical disengager and fines removal apparatus of the later type is disclosed in U.S. Patent No. 2,656,920, issued October 27, 1953, to Reyner Kollgaard. The patent discloses an elutriator closely associated with a disengager vessel as either an external or an internal fines removal unit.

Serious disadvantages in the use of an elutriator for fines removal are the substantial initial cost, the maintenance costs resulting from parts erosion, and the difficulty in achieving any precise control on the maximum size of particles to be removed.

In accordance with the present invention, the aforementioned disadvantages are to a considerable extent obviated by means for continuously withdrawing from the lift disengager a fines-rich portion of the total solids discharge from the lift system; mechanically screening the withdrawn portion of solids to separate small attrited particles or fines, up to a predetermined maximum size, from the larger-size particles which are suitable for re-use; discharging the fines; and returning the larger re-usable particles to the circulatory system by introducing them directly into the compact mass of disengaged solids accumulated as a surge supply within the bottom region of or immediately below the lift disengaging zone. In disengagers of the type wherein all the disengaged solids fall directly onto the surface of a compact moving layer or mass of solids maintained at the bottom of the disengaging zone the side-stream supplying the screening mechanism may be withdrawn from such layer or mass at any location where there is a fines concentration. In those disengagers where the disengaged solids are interrupted in their free fall within the disengaging zone by a tray or trays situated at one or more levels therein, the fines-rich side stream of solids to be screened may be withdrawn from one of the trays. In one preferred arrangement of apparatus, where the vertical distance between the withdrawal tray and the surge bed at the bottom of the disengager will permit, the solids are withdrawn from the tray, screened and returned to the surge bed within such vertical distance.

For a fuller understanding of the invention, reference may be had to the following description and claims taken in connection with the accompanying drawings forming a part of this application, in which:

FIG. 1 is a sectional elevation of a typical pneumatic lift disengager associated with a single lift pipe and incorporating means for fines removal in accordance with the invention:

FIG. 2 is a horizontal cross section taken along the line 2—2 of FIG. 1;

FIG. 3 is a horizontal cross section taken along the line 3—3 of FIG. 1;

FIG. 4 is a horizontal cross section taken along the line 4—4 of FIG. 1;

FIGS. 5, 6 and 7 are fragmentary sectional elevation views respectively of the top, middle, and bottom solids-receiving trays within the disengaging zone of FIG. 1;

FIG. 8 is a fragmentary elevation of the disengager vessel of FIG. 1 showing the manner of attaching a commercial type of vibrating screen, which was omitted from FIG. 1 for lack of space; and FIG. 9 is a fragmentary partial section taken along the line 9—9 of FIG. 8.

In the drawings, FIG. 1 shows the upper end portion of a conventional type pneumatic lift system comprising a disengager vessel 11 associated with a single lift pipe 12, although the invention is equally applicable to multiple lift systems in general, regardless of whether all the lift pipes discharge into a single disengager vessel or groups of lift pipes discharge into individual disengager vessels common to the lift pipes of each group. For example, in a twelve lift pipe system all twelve pipes may discharge into one large disengager, or they may be divided into groups of 2, 3, 4 or 6 lift pipes each group, having a common disengager. A lift system having a single disengager vessel and a single lift pipe has been selected for illustration and description herein primarily for the sake of simplicity in setting forth the nature of the invention.

The elongated disengager vessel is of generally cylindrical shape, comprising a main cylindrical body portion 13 having a dished head 14 closing its upper end and a conical bottom portion 15 having its axis tilted so that the apex is on a projected side of the cylindrical portion 13. Portion 15 has a bottom outlet provided with a draw-off pipe 16, thus forming a funnel for collecting the disengaged solids and returning them to the chemical treating or downflow section of the processing system, not shown.

Since the particular embodiment of the invention illustrated and described herein is concerned with a system in which the disengager vessel receives the discharge from a single lift pipe, it may be assumed for the purpose of showing the applicability of the invention that pipes 12 and 16 represent the single lift pipe and the catalyst return pipe or seal leg, respectively, of processing systems such as those disclosed in an article entitled "New Houdriflow Installations Employ Modified Design," appearing in the September 1950 issue of "Petroleum Refiner."

Along the midsection of disengager vessel 11 there is provided a lift gas outlet 17 to which is connected a vertical stack 18 for discharging the lift gas to the atmosphere.

Lift pipe 12 enters vessel 11 through a loose sleeve member 19 set high in the sloping side of the conical bottom portion 15 so that the upward discharge of the lift pipe will be at the side of the disengager vessel 11 which is opposite the apex of conical portion 15, with the axes of lift pipe 12, cylindrical portion 13 and conical portion 15 being disposed in a common vertical plane. The arrangement is such that the main portion of the solids entering the disengager from lift pipe 12 will have a slight trajectory toward the opposite or draw-off side of the vessel, so that the major portion of the disengaged solids fall freely to one side of the cone of solids rapidly rising from the lift pipe.

The upper end portion of lift pipe 12 extending into the vessel 11 through sleeve 19 passes through a relatively large opening in a sloping segmental tray 21 tilted downwardly toward the axis of the vessel. The arcuate edge of tray 21 is joined to the inner wall of cylindrical section 13 near its lower end, and the free straight edge is located at or slightly short of a vessel diameter. The tray 21 is normal to the plane containing the axes of members 11, 12 and 15, as shown in FIGS. 1 and 4.

The upper end of lift pipe 12 is provided with a conventional expansion device comprising three concentric cylindrical members 22, 23 and 24 loosely interengaged within the large opening in tray 21. The largest cylinder 22 is firmly set in the tray opening, the smallest cylinder 24 is attached at its lower end to the upper end of sleeve 19, and the upper end portion of intermediate size cylinder 23 has an internal flange 25 which rests upon an external flange 26 attached near the upper end of lift pipe 12.

Disengaged solids falling in the region immediately surrounding the upper end of lift pipe 12 are intercepted in their free fall by the tray 21. Spaced flat bars 27 are set on edge upon the upper surface of tray 21, parallel to its lower edge. The straight lower edge is provided with a flat coaming bar 28, as shown in FIGS. 1, 4 and 7. Bars 27 and 28 serve to retain a fixed compact layer of solids upon the surface of the segmental tray to cushion the impact of solids falling upon the tray, thereby minimizing breakage as well as rebound. Solids received by tray 21 spill over coaming bar 28 and fall to the surface of a compact bed of solids 29 constantly maintained as surge within the conical portion 15.

At the diametrically opposite side of cylindrical section 13 there are two additional segmental trays 31 and 32, the former being set at an intermediate level just above the lift gas outlet 17 and the latter at an upper level within the section 13. Trays 31 and 32 slope downwardly toward the side of the vessel so as to form receptacles or basins therewith. The uppermost tray 32 extends inwardly to overhang about one-third of the distance across the vessel, while intermediate tray 31 extends inwardly to cover about one-half such distance. Tray 31 is provided with two vertical drain pipes 33 spaced from each other and from the walls of section 13 and a vertical baffle plate 34 depending from the underside of tray 31 and extending across the section 13 in a chordal plane. The baffle plate 34 extends below the level of lift gas outlet 17 so that there are no moving solids in the immediate vicinity of the gas outlet.

Uppermost tray 32 is provided with a row of rectangular openings 35 along its arcuate edge through which disengaged solids intercepted by the tray may drain and fall freely to the surface of the pile of intercepted solids on intermediate tray 31. Both trays 31 and 32 have surface rows of flat bars and outer edge coaming bars similar to those of tray 21, as clearly shown in FIGS. 1, 2, 3, 5 and 6. Drain pipes 33 extend a short distance above the surface of tray 31 so that a substantial depth of compact moving solids is constantly provided in the basin formed by the tray.

At the upper end of vessel 11 there is an inclined baffle plate 36 which serves as a wear plate and deflects extremely high-rising particles of solids toward the opposite side of the vessel, containing trays 31 and 32.

Along the inside wall of draw-off section 15 and above the discharge pipe 16 there is a curved plate or shield 37 having straight vertical edges joined to the wall, as shown in FIGS. 1 and 4. Shield 37 extends from a level slightly above the bottom of drain pipes 33 to a level well within the surge bed 29, so that the solids discharging from pipes 33 fall outside the hollow space 38 enclosed by the shield.

A portion of the disengaged solids accumulated on tray 31 is constantly withdrawn through sloping draw-off pipe 41 communicating with the interior of vessel 11 through a side opening provided in the wall of cylindrical section 13 just above the lowermost portion of the tray. The withdrawn portion is rich in fines because the arrangement of the tray and its drain pipes 33 serves as a solids classifier. The larger-size solids falling upon the compact mass of solids on the tray roll easily down the sloping surfaces leading to the mouths of pipes 33, while the fines tend to sink into the mass which is gradually descending to the mouth of draw-off pipe 41. Pipe 41 has a branch outlet 42 near its lower end connecting through a flanged joint 43 with a conventional slide valve device 44. Slide valve 44 discharges a controlled flow of solids through connector 45 into a feed hopper 46 which supplies the solids to a vibrating screen mechanism 47 of commercial design adapted to screen out the small-size particles or fines. The fines passing through the screening mechanism are caught in a funnel-shaped receiving hopper 48 attached to the underside of vibrating screen mechanism 47. From hopper 48 the fines are discharged through outlet pipe 49.

The vibrating screen mechanism 47 is tilted so that the stream of solids withdrawn from tray 31 readily flows from the higher to the lower end of the vibrating screen under the action of its vibrating mechanism. At the lower end of the screen mechanism 47 the screened solids flow downwardly through a vertical discharge chute 51 having a branch conduit 52 near its lower end. Conduit 52 slopes downwardly toward the side wall of vessel 11 and is connected to a pipe 53 which returns the fines-free solids to the vessel 11. Pipe 53 enters vessel 11 at a low level within the conical section 15 and at a point within the solids-free space 38 behind the shield 37. The returned solids are thereby introduced into the moving bed of solids 29.

During the operation of the fines removal apparatus periodic sampling of the solids mixture entering the vibrating screen mechanism 47 and of the solids mixture being returned to the circulatory system through pipe 53 may readily be effected through drain valves 45 and 55 provided at the lower ends of pipe 41 and discharge chute 51, respectively.

The external apparatus for separating unwanted fines from the solid particles that are of a size suitable for recirculation has not been illustrated or described in any great detail because, of itself, it forms no part of the invention. It is contemplated that any of a number of readily available commercial screening mechanisms may be employed for the purposes herein specified.

By the apparatus of the present invention substantial operational advantages are obtained and appreciable savings in initial and maintenance costs are effected. Elimination of the standard elutriator mechanism, which has heretofore been a part of most solids circulating systems of the type referred to herein, obviates the severe erosion problems attending the use of elutriators and provides a much sharper separation according to size. Since elutriation is carried out in separate vessels of substantial size, requiring considerable supporting structure and piping arrangements, the compactness of applicant's apparatus is of appreciable advantage. Furthermore, the use of a vibrating screen causes less impact breakage of the solids.

An additional advantage of the invention is that the solids are withdrawn, screened, and returned to the system by gravity flow within a relatively short vertical distance along the downflow path, without the need for special lift apparatus for returning the solids to be recirculated. Furthermore, the solids are returned directly to the surge supply for the system, whether it be contained in the bottom of the disengager or in a separate vessel, thereby avoiding the aforementioned problems incident to the return of elutriated solids to any of the treating zones.

While the disclosed embodiment of the invention serves to pre-classify the solids before they are withdrawn from the vessel, it is contemplated that separate external classification may be provided before the solids enter the vibrating screen mechanism.

Obviously many modifications and variations of the invention as hereinbefore set forth may be made without departing from the spirit and scope thereof, and therefore only such limitations should be imposed as are indicated in the appended claims.

What is claimed is:

1. In a chemical processing system including a pneumatic lift for maintaining a continuous circulation of granular solids through a treating section, apparatus for disengaging the elevated solids from the lift gas and removing fines from the disengaged solids which comprises: a disengager vessel at the top of the pneumatic lift adapted to receive an upward discharge of solids and lift gas at a low level therein, the vertical and horizontal dimensions of said vessel being sufficient to effect complete gravitational deceleration of the solids and free-fall thereof outside the path of the rapidly rising solids discharging from the lift; a sloping tray joined to the inside wall of said vessel at an intermediate level above the discharge end of said lift and forming with said wall a basin to contain an accumulated mass of intercepted falling solids; a drain pipe extending through said tray from an intermediate level within said basin to a level within the bottom region of said vessel below said discharge level; a side drain pipe for withdrawing solids from the bottom of said basin; an external screening mechanism connected to said side drain pipe and adapted to remove fines from the withdrawn solids; a return pipe at the discharge end of said screening mechanism for conveying larger-size screened solids into the bottom region of said vessel; and a shield having its vertical edges joined to the inner walls of said vessel at either side of the discharge end of said return pipe, said shield forming with said walls a hollow space extending from a level above the discharge end of said drain pipe to a level below the discharge end of said return pipe; and a lift gas outlet at the side of said vessel directly beneath said tray.

2. Apparatus as in claim 1 including a vertical baffle extending downwardly from the underside of said tray to a level below said lift gas outlet.

3. Apparatus as in claim 2 in which said vertical baffle is located between said drain pipe and the adjacent wall of said vessel.

4. Apparatus as in claim 1 including additional sloping trays above and below the first-mentioned tray.

5. Apparatus as in claim 4 having a single tray above said first-mentioned tray sloping in the same direction and having openings along its arcuate edge to permit drainage of the solids accumulated thereon to the tray below.

6. Apparatus as in claim 4 having a single bottom tray below said first-mentioned tray but at the opposite side of said vessel, said bottom tray sloping downwardly toward the vertical axis of said vessel so that the solids intercepted thereon drain off the free edge of the tray.

References Cited in the file of this patent

UNITED STATES PATENTS 2,656,920    Kallgaard                Oct. 27, 1953

FOREIGN PATENTS 536,796    Canada                  Feb. 5, 1957